United States Patent
Joten

(10) Patent No.: US 7,081,934 B2
(45) Date of Patent: Jul. 25, 2006

(54) SEMITRANSPARENT LIQUID CRYSTAL DISPLAY ELEMENT

(75) Inventor: Kazuhiro Joten, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 10/995,323

(22) Filed: Nov. 24, 2004

(65) Prior Publication Data

US 2005/0073631 A1 Apr. 7, 2005

Related U.S. Application Data

(63) Continuation of application No. PCT/JP04/02166, filed on Feb. 25, 2004.

(30) Foreign Application Priority Data

Feb. 25, 2003 (JP) .............................. 2003-048044

(51) Int. Cl.
*G02F 1/1335* (2006.01)
*G02F 1/139* (2006.01)

(52) U.S. Cl. ...................... 349/114; 349/99; 349/119; 349/180; 349/181

(58) Field of Classification Search .................. 349/99, 349/113, 114, 179, 119, 180, 181
See application file for complete search history.

(56) References Cited

U.S. PATENT DOCUMENTS

| | | | | |
|---|---|---|---|---|
| 6,801,283 B1 * | 10/2004 | Koyama et al. | ............. | 349/119 |
| 6,947,112 B1 * | 9/2005 | Suh et al. | .................. | 349/117 |
| 2003/0210365 A1 * | 11/2003 | Koyama et al. | ............ | 349/113 |
| 2004/0263729 A1 * | 12/2004 | Itou et al. | .................. | 349/117 |

FOREIGN PATENT DOCUMENTS

| | | |
|---|---|---|
| JP | 1-270024 | 10/1989 |
| JP | 2000-137217 | 5/2000 |
| JP | 2003-233069 | 8/2003 |

OTHER PUBLICATIONS

U.S. Appl. No. 10/934,433, filed Sep. 7, 2004, Joten.
U.S. Appl. No. 10/986,382, filed Nov. 12, 2004, Joten.

(Continued)

*Primary Examiner*—Toan Ton
*Assistant Examiner*—Tai Duong
(74) *Attorney, Agent, or Firm*—Oblon, Spivak, McClelland, Maier & Neustadt, P.C.

(57) ABSTRACT

A semitransparent liquid crystal display element comprises a liquid crystal panel composed of a plurality of pixels each having a reflective portion and a transparent portion arranged therein, a first polarizer sheet located on the observer's side of the liquid crystal panel, and a second polarizer sheet located on the opposite side of the liquid crystal panel from the first polarizer sheet, the angle of twist of a liquid crystal molecule which forms each pixel of the liquid crystal panel ranging from 44 degrees to 46 degrees. An angle between an absorption axis of the first polarizer sheet and a major axis of a liquid crystal molecule adjacent thereto ranges from 80 degrees to 85 degrees, and an angle between an absorption axis of the second polarizer sheet and a liquid crystal molecule adjacent thereto ranges from 50 degrees to 55 degrees.

6 Claims, 5 Drawing Sheets

OTHER PUBLICATIONS

U.S. Appl. No. 10/995,323, filed Nov. 24, 2004, Joten.

U.S. Appl. No. 10/995,495, filed Nov. 24, 2004, Joten.

* cited by examiner

| Twist angle | Gap fluctuation range Δd |
|---|---|
| 0 deg | ±0.1 μm |
| 45 deg | ±0.4 μm |
| 62 deg | ±0.8 μm |

F I G. 5

SEMITRANSPARENT LIQUID CRYSTAL DISPLAY ELEMENT

CROSS-REFERENCE TO RELATED APPLICATIONS

This is a continuation Application of PCT Application No. PCT/JP2004/002166, filed Feb. 25, 2004, which was published under PCT Article 21(2) in Japanese.

This application is based upon and claims the benefit of priority from prior Japanese Patent Application No. 2003-048044, filed Feb. 25, 2003, the entire contents of which are incorporated herein by reference.

BACKGROUND OF THE INVENTION

1. Field of the Invention

The present invention relates to a semitransparent liquid crystal display element provided with a liquid crystal panel composed of a plurality of pixels each having a reflective portion and a transparent portion arranged therein.

2. Description of the Related Art

Configurations of conventional semitransparent liquid crystal display elements are described in Jpn. Pat. Appln. KOKAI Publication No. 2000-137217 and Jpn. Pat. Appln. KOKAI Publication No. 2003-233069. For a semitransparent liquid crystal display element that is provided with a liquid crystal panel composed of a plurality of pixels each having a reflective portion and a transparent portion arranged therein, the balance between reflection properties and transmission properties are expected to be improved, and better productivity is requested.

The configuration of a semitransparent film that is provided in a semitransparent liquid crystal display element is based on the formation of an ideal circular polarization sheet. In order to form the ideal circular polarization sheet, the optical axis of an ideal $\lambda/4$ sheet should only be adjusted so that it is inclined at an angle of 45 degrees to a Pol absorption axis.

Actually, however, there is no ideal $\lambda/4$ sheet that has a $\lambda/4$ function in the whole wavelength region. Therefore, a method is generally adopted such that an ideal $\lambda/4$ sheet is approximated by a combination of an RF equivalent to $\lambda/4$ and an RF equivalent to $\lambda/2$.

When the ideal $\lambda/4$ sheet is thus approximated by combining the RF equivalent to $\lambda/4$ and the RF equivalent to $\lambda/2$, an important point is how to optimize the respective axial angle layouts and R-values of the RF equivalent to $\lambda/4$, RF equivalent to $\lambda/2$ and Pol for liquid crystal cells.

In general, the axial angle layout and R-value are optimized for liquid crystal cells by means of a simulation tool, such as an LCD master. However, this method is not efficient, since the axial angle layout and R-value must be optimized every time optical constants, such as liquid crystal materials of the liquid crystal cells and RFs, RF material, twist angle, etc., change.

In order to solve this problem, a method is proposed to settle an axial angle configuration that depends little on changes of the optical constants of the liquid crystal cells and RFs.

First, there will be described a method of settling the angle of the optical axis of a $\lambda/4$ sheet with respect to a liquid crystal molecule director of a liquid crystal cell. Usually, the angle of the optical axis is determined with respect to a liquid crystal molecule that adjoins a substrate. If the angle of the optical axis of the $\lambda/4$ sheet with respect to the liquid crystal molecule director is optimized, however, the angle of the optical axis of the $\lambda/4$ sheet can be optimized without depending on the change of the twist angle of the liquid crystal molecules. The following is a specific description of this optimization method.

Let it first be supposed that the optical axis of the $\lambda/4$ sheet that is formed by combining the RF equivalent to $\lambda/4$ and the RF equivalent to $\lambda/2$ exists along the direction of a synthetic vector of individual optical axes. The optical axis of the RF equivalent to $\lambda/4$ is aligned with the direction of the liquid crystal molecule director, and an angle between the RF equivalent to $\lambda/2$ and the Pol absorption axis is optimized. If an angle between the $\lambda/4$ sheet and the $\lambda/2$ sheet is $\alpha$, and if either an angle between the $\lambda/4$ sheet and the Pol or an angle between the $\lambda/2$ sheet and the Pol, whichever is smaller, is $\beta$, the following relational expression must be established:

$$35 \leq (\alpha/2)+\beta \leq 55. \quad \text{(Expression 1)}$$

Thus, in order to manufacture a circular polarization sheet, an angle between the optical axis of the ideal $\lambda/4$ sheet and the Pol must be set to range from 35 degrees to 55 degrees.

The angle between the $\lambda/2$ sheet and the Pol is adjusted to meet the condition given by Expression 1.

FIG. 4 is a graph showing the relation between the twist angle and transmittance of liquid crystal molecules in a conventional semitransparent liquid crystal display element. FIG. 4 shows the relation between the twist angle and transmittance of the axial angle configuration that is settled by the aforementioned method. The axis of abscissa represents the twist angle, while the axis of ordinate represents the transmittance standardized at 62 degrees. Based on an angle x between the transmission axis of the polarization sheet and the polarization direction of transmitted light that is delivered from the liquid crystal cell and transmitted through the RF equivalent to $\lambda/4$ and the RF equivalent to $\lambda/2$ in the order named, the transmittance is obtained according to Expression 2 as follows:

$$\text{Transmittance}=\cos^2(x). \quad \text{(Expression 2)}$$

If the polarization direction of the aforesaid transmitted light is aligned with the transmission axis of the polarization sheet, therefore, the transmittance is 100 percent (%).

As shown in FIG. 4, the transmittance is 2 when the twist angle of the liquid crystal molecules is zero degree. When the twist angle of the liquid crystal molecules is 45 degrees, the transmittance is 1.4. If the transmittance is 1 when the twist angle of the liquid crystal molecules is 62 degrees, the transmittance is 1.4 when the twist angle of the liquid crystal molecules is 45, and the transmittance is 2 when the twist angle of the liquid crystal molecules is 0 degree. Thus, the greater the twist angle of the liquid crystal molecules, the lower the transmittance is.

The following is a description of the balance between optical properties and manufacturing margins that are indicative of the ease of manufacture of semitransparent liquid crystal display elements. FIG. 5 is a diagram showing the relation between the twist angle and a gap fluctuation range $\Delta d$ of the liquid crystal molecules in the conventional semitransparent liquid crystal display element.

FIG. 5 shows the result of examination of the gap fluctuation range $\Delta d$ that is allowed by an optical property for reflection with respect to each twist angle. When the twist angle of the liquid crystal molecules is zero degree, the gap fluctuation range $\Delta d$ is ±0.1 micrometer (μm). When the twist angle of the liquid crystal molecules is 45 degrees, the gap fluctuation range $\Delta d$ is ±0.4 micrometer (μm). When the twist angle of the liquid crystal molecules is 62 degrees, the gap fluctuation range Δd is ±0.8 micrometer (μm).

As seen from the results shown in FIGS. 4 and 5, the transmittance is at its highest, 2.0, if the twist angle of the liquid crystal molecules is zero degree. Since the gap fluctuation range Δd that indicates a margin for reflection properties is as narrow as ±0.1 micrometer (μm), however, it is very hard to manufacture a semitransparent liquid crystal display element. This is because the gap fluctuation range Δd for normal manufacturing processes for semitransparent liquid crystal display elements should be as wide as about ±0.3 micrometer (μm).

Thus, the gap fluctuation range Δd for normal manufacturing processes for semitransparent liquid crystal display elements is expected to be about ±0.3 micrometer (μm). Preferably, therefore, the twist angle of the liquid crystal molecules should be 45 degrees with which the gap fluctuation range Δd is ±0.4 micrometer (μm), which is approximate to about ±0.3 micrometer (μm).

If the twist angle of the liquid crystal molecules is adjusted to 45 degrees, in view of the manufacturing margins that are indicative of the ease of manufacture of semitransparent liquid crystal display elements, as mentioned before, however, the transmittance is much lower as compared to the case where the twist angle of the liquid crystal molecules is zero degree.

The object of the present invention is to provide a semitransparent liquid crystal display element free from lowering of transmittance and easy to manufacture.

BRIEF SUMMARY OF THE INVENTION

According to the present invention, there is provided a semitransparent liquid crystal display element comprising: a liquid crystal panel composed of a plurality of pixels each having a reflective portion and a transparent portion arranged therein; a first polarizer sheet located on the observer's side of the liquid crystal panel; and a second polarizer sheet located on the opposite side of the liquid crystal panel from the first polarizer sheet, the angle of twist of a liquid crystal molecule which forms each pixel of the liquid crystal panel ranging from 44 degrees to 46 degrees, wherein an angle between an absorption axis of the first polarizer sheet and a major axis of a liquid crystal molecule adjacent thereto ranges from 80 degrees to 85 degrees, and an angle between an absorption axis of the second polarizer sheet and a liquid crystal molecule adjacent thereto ranges from 50 degrees to 55 degrees.

BRIEF DESCRIPTION OF THE SEVERAL VIEWS OF THE DRAWING

FIG. 5 is a diagram showing the relation between the twist angle and a gap fluctuation range of the liquid crystal molecules in the conventional semitransparent liquid crystal display element.

DETAILED DESCRIPTION OF THE INVENTION

In a semitransparent liquid crystal display element according to the present embodiment, the angle of twist of a liquid crystal molecule that forms each pixel of a liquid crystal panel ranges from 44 degrees to 46 degrees. An angle between the absorption axis of a first polarizer sheet and the major axis of its adjacent liquid crystal molecule ranges from 80 degrees to 85 degrees. An angle between the absorption axis of a second polarizer sheet and the major axis of its adjacent liquid crystal molecule ranges from 50 degrees to 55 degrees. Thus, the transmission properties can be improved without lowering the reflection properties, and a semitransparent liquid crystal display element that ensures satisfactory productivity can be obtained.

In this embodiment, the display element further comprises a first λ/2 sheet, which is interposed between the liquid crystal panel and the first polarizer sheet, and a first λ/4 sheet, which is interposed between the first λ/2 sheet and the liquid crystal panel. Preferably, an angle between the respective lag axes of the first λ/2 and λ/4 sheets ranges from 60 degrees to 70 degrees.

The display element further comprises a second λ/2 sheet, which is interposed between the liquid crystal panel and the second polarizer sheet, and a second λ/4 sheet, which is interposed between the second λ/2 sheet and the liquid crystal panel. Preferably, an angle between the respective lag axes of the second λ/2 and λ/4 sheets ranges from 60 degrees to 70 degrees.

Preferably, a retardation Δnd at the reflective portion that is located in each pixel ranges from 160 nanometers (nm) to 250 nanometers (nm).

Preferably, a retardation Δnd at the transparent portion that is located in each pixel ranges from 280 nanometers (nm) to 350 nanometers (nm).

Preferably, the display element further comprises a backlight supply unit that is provided on the opposite side of the second polarizer sheet from the liquid crystal panel, in order to supply a backlight to the liquid crystal molecules of the liquid crystal panel.

The embodiment of the present invention will now be described with reference to the drawings.

Figure 1:
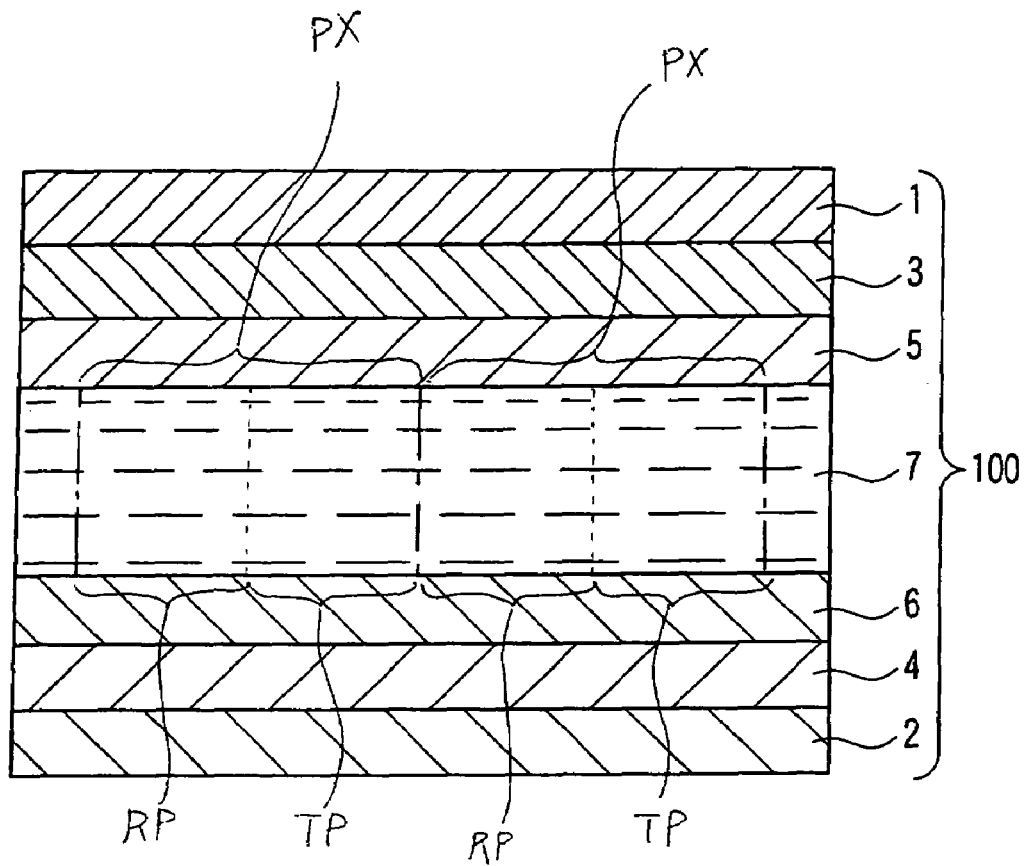
FIG. 1 is a sectional view showing a configuration of a semitransparent liquid crystal display element according to the present embodiment.
Figure 2:
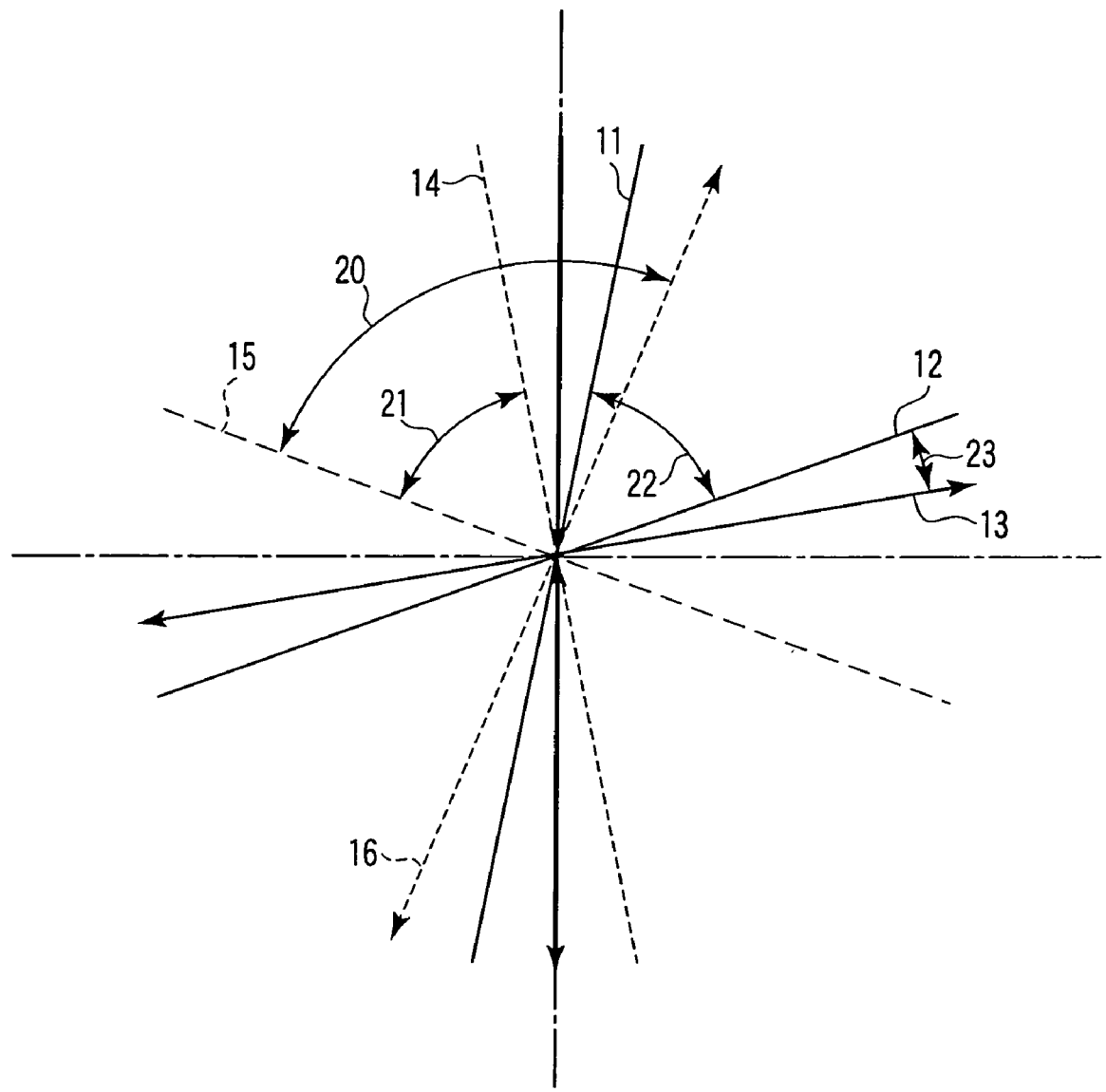
FIG. 2 is a typical plan view for illustrating polarization axes of polarizer sheets and the respective lag axes of a λ/2 and a λ/4 sheet in the semitransparent liquid crystal display element according to the present embodiment.

FIG. 1 is a sectional view showing a configuration of a semitransparent liquid crystal display element 100 according to the present embodiment. FIG. 2 is a typical plan view for illustrating polarization axes of polarizer sheets and the respective lag axes of the λ/2 and λ/4 sheets in the semitransparent liquid crystal display element 100.

The semitransparent liquid crystal display element 100 is provided with a liquid crystal panel 7. The liquid crystal panel 7 is composed of a plurality of pixels PX, and a reflective portion RP and a transparent portion TP are arranged in each pixel.

Each pixel of the liquid crystal panel 7 is composed of a liquid crystal molecule. The angle of twist of the liquid crystal molecule ranges from 44 degrees to 46 degrees.

A retardation Δnd at the reflective portion that is located in each pixel of the liquid crystal panel 7 ranges from 160 nanometers (nm) to 250 nanometers (nm). A retardation Δnd at the transparent portion that is located in each pixel of the liquid crystal panel 7 ranges from 280 nanometers (nm) to 350 nanometers (nm).

The semitransparent liquid crystal display element 100 is provided with a polarizer sheet 1. The polarizer sheet 1 is located on the on the observer's side of the liquid crystal panel 7. An angle between the absorption axis of the polarizer sheet 1 and the major axis of its adjacent liquid crystal molecule ranges from 80 degrees to 85 degrees.

The semitransparent liquid crystal display element 100 is provided with a polarizer sheet 2. The polarizer sheet 2 is located opposite the polarizer sheet 2 with the liquid crystal panel 7 between them. An angle between the absorption axis of the polarizer sheet 2 and the major axis of its adjacent liquid crystal molecule ranges from 50 degrees to 55 degrees.

The semitransparent liquid crystal display element 100 is provided with a $\lambda/2$ sheet 3. The $\lambda/2$ sheet 3 is located between the liquid crystal panel 7 and the polarizer sheet 1.

The semitransparent liquid crystal display element 100 is provided with a $\lambda/4$ sheet 5. The $\lambda/4$ sheet 5 is located between the $\lambda/2$ sheet 3 and the liquid crystal panel 7. An angle 22 between a lag axis 12 of the $\lambda/2$ sheet 3 and a lag axis 11 of the $\lambda/4$ sheet 5 ranges from 60 degrees to 70 degrees. Preferably, the angle 22 is 60 degrees. In the present embodiment, an angle 23 between a polarization axis 13 of the polarizer sheet 1 and the lag axis 12 of the $\lambda/2$ sheet 3 is 70 degrees.

The semitransparent liquid crystal display element 100 is provided with a $\lambda/2$ sheet 4. The $\lambda/2$ sheet 4 is located between the liquid crystal panel 7 and the polarizer sheet 2.

The semitransparent liquid crystal display element 100 is provided with a $\lambda/4$ sheet 6. The $\lambda/4$ sheet 6 is located between the $\lambda/2$ sheet 4 and the liquid crystal panel 7. An angle 21 between a lag axis 15 of the $\lambda/2$ sheet 4 and a lag axis 14 of the $\lambda/4$ sheet 6 ranges from 60 degrees to 70 degrees. Preferably, the angle 21 is 60 degrees. In the present embodiment, an angle 20 between a polarization axis 16 of the polarizer sheet 2 and the lag axis 15 of the $\lambda/2$ sheet 4 is 23.5 degrees.

The semitransparent liquid crystal display element 100 is provided with a backlight supply unit 8. The backlight supply unit 8 is provided on the opposite side of the polarizer sheet 2 from the liquid crystal panel 7, in order to supply a backlight to the liquid crystal molecules of the liquid crystal panel 7.

Figure 3:
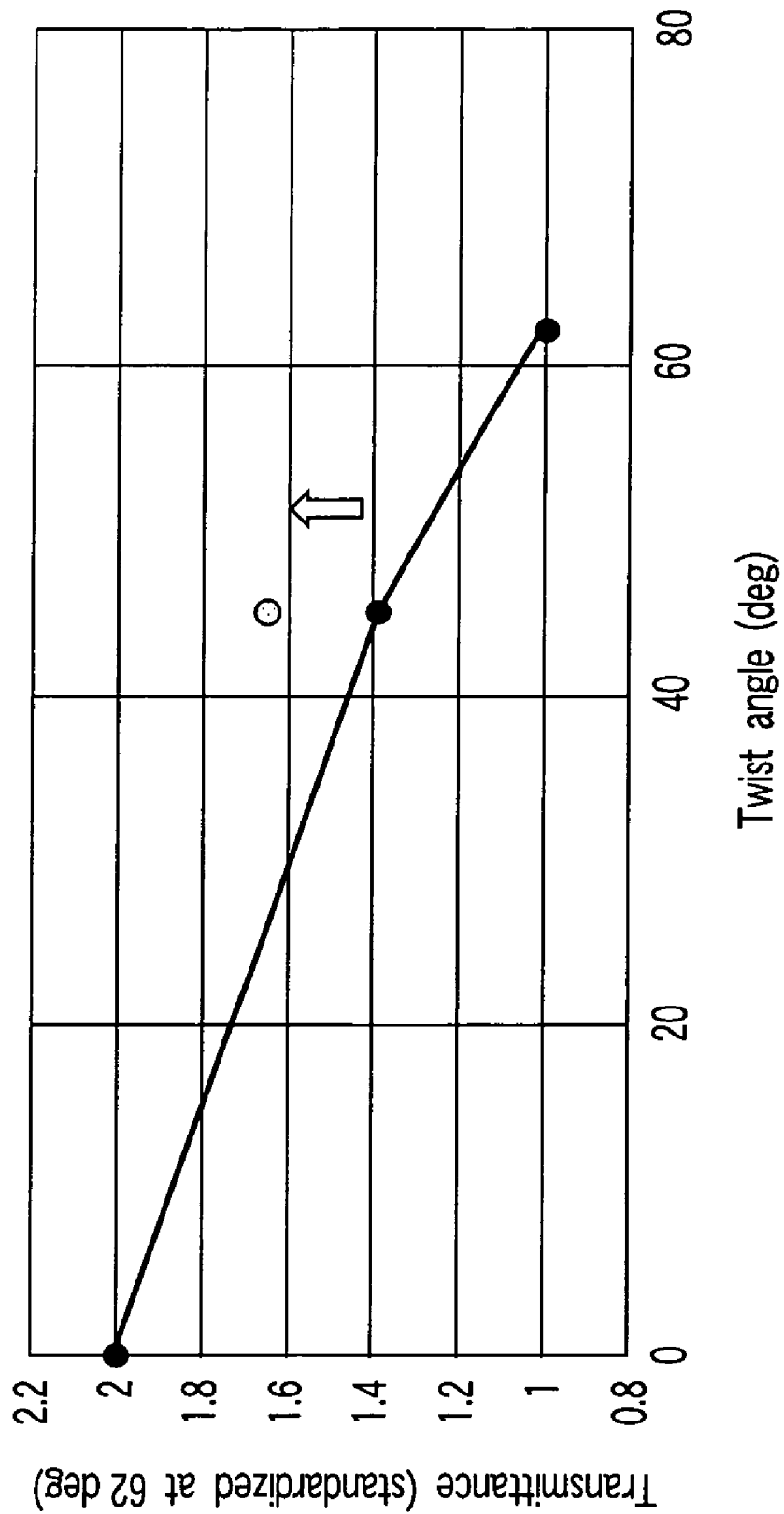
FIG. 3 is a graph showing the relation between the twist angle and transmittance of liquid crystal molecules in the semitransparent liquid crystal display element according to the present embodiment.
Figure 4:
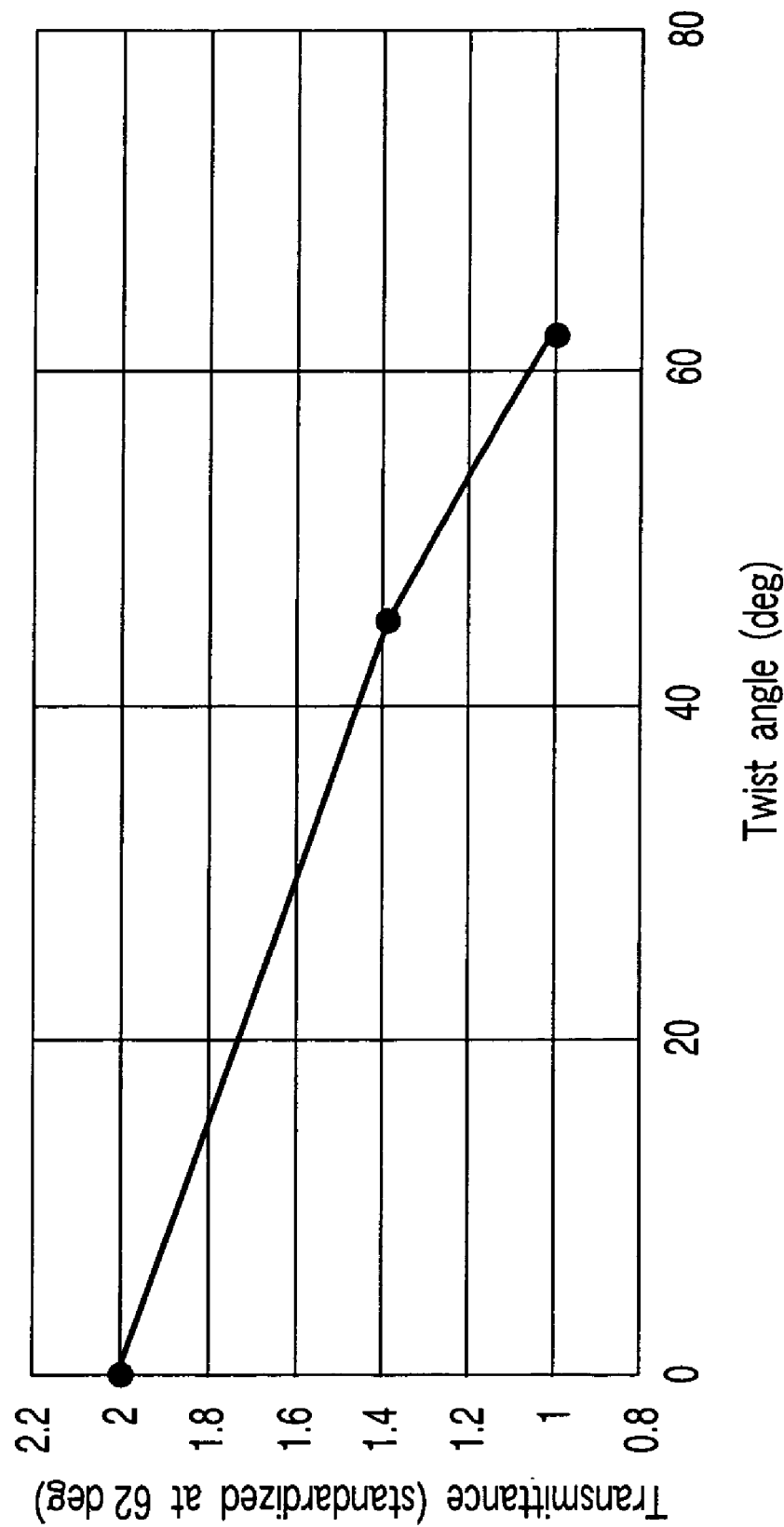
FIG. 4 is a graph showing the relation between the twist angle and transmittance of liquid crystal molecules in a conventional semitransparent liquid crystal display element.

FIG. 3 is a graph showing the relation between the twist angle and transmittance of the liquid crystal molecules in the semitransparent liquid crystal display element 100 according to the present embodiment.

As mentioned before, the angle of twist (twist angle) of the liquid crystal molecule that forms each pixel of the liquid crystal panel 7 in the semitransparent liquid crystal display element 100 ranges from 44 degrees to 46 degrees. The angle between the absorption axis of the polarizer sheet 1 and the major axis of its adjacent liquid crystal molecule ranges from 80 degrees to 85 degrees. The angle between the absorption axis of the polarizer sheet 2 and the major axis of its adjacent liquid crystal molecule ranges from 50 degrees to 55 degrees. The transmittance of the semitransparent liquid crystal display element 100 with the twist angle of 44 degrees to 46 degrees constructed in this manner is increased to 1.65, which is 17 percent (%) higher than the transmittance, 1.4, of the aforementioned conventional semitransparent liquid crystal display element, as shown in FIG. 3.

According to the present embodiment, as described above, the angle of twist of the liquid crystal molecule that forms each pixel of the liquid crystal panel 7 ranges from 44 degrees to 46 degrees. The angel between the absorption axis of the polarizer sheet 1 and the major axis of its adjacent liquid crystal molecule ranges from 80 degrees to 85 degrees. The angle between the absorption axis of the polarizer sheet 2 and the major axis of its adjacent liquid crystal molecule ranges from 50 degrees to 55 degrees. Thus, a semitransparent liquid crystal display element with the twist angle of 44 degrees to 46 degrees can be obtained such that the transmittance can be improved and that its gap fluctuation range $\Delta d$ is wide enough to ensure satisfactory productivity.

According to the present invention, as described above, there may be provided a semitransparent liquid crystal display element free from lowering of transmittance and easy to manufacture.

What is claimed is:

1. A semitransparent liquid crystal display element comprising:
   a liquid crystal panel composed of a plurality of pixels each having a reflective portion and a transparent portion arranged therein;
   a first polarizer sheet located on an observer's side of the liquid crystal panel;
   and a second polarizer sheet located on an opposite side of the liquid crystal panel from the first polarizer sheet, the angle of twist of a liquid crystal molecule which forms each pixel of the liquid crystal panel ranging from 44 degrees to 46 degrees, wherein
   an angle between an absorption axis of the first polarizer sheet and a major axis of a liquid crystal molecule adjacent thereto ranges from 80 degrees to 85 degrees, and
   an angle between an absorption axis of the second polarizer sheet and a major axis of a liquid crystal molecule adjacent thereto ranges from 50 degrees to 55 degrees.

2. A semitransparent liquid crystal display element according to claim 1, which further comprises a first $\lambda/2$ sheet, located between the liquid crystal panel and the first polarizer sheet, and a first $\lambda/4$ sheet, located between the first $\lambda/2$ sheet and the liquid crystal panel, an angle between a lag axis of the first $\lambda/2$ sheet and a lag axis of the first $\lambda/4$ sheet ranging from 60 degrees to 70 degrees.

3. A semitransparent liquid crystal display element according to claim 1, which further comprises a second $\lambda/2$ sheet, located between the liquid crystal panel and the second polarizer sheet, and a second $\lambda/4$ sheet, located between the second $\lambda/2$ sheet and the liquid crystal panel, an angle between a lag axis of the second $\lambda/2$ sheet and a lag axis of the second $\lambda/4$ sheet ranging from 60 degrees to 70 degrees.

4. A semitransparent liquid crystal display element according to claim 1, wherein a retardation $\Delta nd$ at the reflective portion located in each pixel ranges from 160 nanometers to 250 nanometers.

5. A semitransparent liquid crystal display element according to claim 1, wherein a retardation $\Delta nd$ at the transparent portion located in each pixel ranges from 280 nanometers to 350 nanometers.

6. A semitransparent liquid crystal display element according to claim 1, which further comprises a backlight supply unit provided on the opposite side of the second polarizer sheet from the liquid crystal panel in order to supply a backlight to liquid crystal molecules of the liquid crystal panel.

* * * * *